XR 3,848,179

United States Patent [19]

Kayama

[11] 3,848,179

[45] Nov. 12, 1974

[54] POWER SUPPLYING DEVICE

[75] Inventor: Takashi Kayama, Tokyo, Japan

[73] Assignee: Sony Corporation, Tokyo, Japan

[22] Filed: Sept. 21, 1973

[21] Appl. No.: 399,303

[30] Foreign Application Priority Data

Sept. 22, 1972 Japan .............................. 47-95342

[52] U.S. Cl. ........ 323/22 T, 178/DIG. 11, 307/297, 317/31, 317/33 VR, 317/44, 323/22 Z

[51] Int. Cl. .............................................. G05f 1/00

[58] Field of Search ........... 323/22 T, 22 Z, 9, 100; 317/31, 33 VR, 441; 307/297; 178/DIG. 1, DIG. 11

[56] References Cited

UNITED STATES PATENTS 3,437,905 4/1969 Healey et al. .......................... 323/9

3,602,802 8/1971 Chan et al. ........................ 323/100

3,671,852 6/1972 Bitzenthaler .......................... 323/9

*Primary Examiner*—J. D. Miller

*Assistant Examiner*—Harry E. Moose, Jr.

*Attorney, Agent, or Firm*—Lewis H. Eslinger, Esq., Alvin Sinderbrand, Esq.

[57] ABSTRACT

A power supply that includes a voltage source capable of generating high and low voltages, and a resistor connecting the voltage source to an output terminal. A circuit is included to detect the voltage at the output terminal to control the voltage source so that the latter will generate the high voltage only when the detected voltage has the proper value.

5 Claims, 2 Drawing Figures

POWER SUPPLYING DEVICE

BACKGROUND OF THE INVENTION

1. Field of the Invention

This invention relates to a power supply and particularly to a supply that is controlled to keep it from generating too high an output voltage when it is connected to a circuit incapable of handling high voltage.

2. The Prior Art

It has proposed heretofore to provide a system in which both operating power and video signals are transmitted by one transmission line instead of by a multiconductor cable. For example, in an industrial television system, a power supply and a television camera are connected together by a single coaxial cable that carries the direct current from the supply to the camera and simultaneously carries a video signal from the camera back to the power supply. The camera includes direct current circuits that are operated by the directed current from the coaxial cable and it also includes an alternating current connection from the output circuit of the camera to the coaxial cable to superimpose on the direct voltage of the video output signal of the camera. The power supply includes not only means for furnishing direct current to the coaxial cable but also alternating current coupling means to estract the video signal and supply it to a second coaxial cable that is connected to an input circuit of a television monitor. The monitor does not receive direct current from the power supply but has its own power suqply. The coaxial cable from the power supply to the monitor is connected within the monitor to a circuit that matches the impedance of the cable, and this circuit is connected to other circuits that produce a television image according to the signals generated in the camera.

In order to minimize the number of spare parts that must be kept available to repair the system, it is desirable to use the same type of coaxial cable to connect the power supply to the monitor as issued to connect the power supply to the camera. As a result, it is possible for these cables to be connected in the wrong way so that the direct voltage output of the power supply, instead of being connected to the camera, is connected to the input circuit of the monitor. As a result of applying such voltage to the monitor, the input circuit of the monitor may burn out and some of the circuits in the power supply may also burn out.

It is a principal object of the present invention to provide a safety circuit in the power supply that will keep the voltage produced by the power supply at a safe, low level until the circuit determined that the direct voltage output terminals of the power supply are connected to the proper circuit of utilizing this direct voltage.

SUMMARY OF THE INVENTION

A resistor, which is commonly used as the input impedance to a television monitor is a linear electrical device, which means that the current through the resistor is a linear function of the voltage across the resistor. The operating circuit of a television camera is equivalent to an impedance but is not linear in the same way that a resistor is linear. As a result, when the operating voltage applied to a television camera is reduced to a certain fraction of its previous value, the current through the circuit will be reduced to a smaller fraction. Since resistance is equal to the ratio of voltage divided by a current, a television camera is the equivalent of a resisor of one value when the operating voltage is a relatively high level but is the equivalent of a higher resistor when the operating voltage is at a lower level. This is the same thing as saying that a television camera is equivalent to a non-linear resistor.

The present invention makes use of the fact that a small direct voltage can be safely applied to the input circuit of a television monitor, and it makes further use of the fact that the input circuit of the monitor has a linear voltage-current relationship whereas the camera circuit has a non-linear relationship between operating direct voltage and operating direct current. The power supply includes a voltage regulator circuit in which the input direct voltage is controlled by comparing a fraction of that voltage with the reference voltage. Instead of keeping the reference voltage fixed, as is usually the case in power supply regulator circuits, the present invention includes a means to cause the reference voltage to have either a high value or a low value. As a result, the output voltage will also have either a high value or a low value.

The alternating current impedance across the output terminal of the usual power supply regulator circuit is quite low. If that were true in the present circuit, it would be impossible to transmit the video signal back along the coaxial cable from the camera to the power supply. Thus, it is necessary to include an impedance in series between the voltage regulator and one of the output terminals of the power supply. Further in accordance with this invention, the power supply includes another comparison circuit that compares the voltage across the output terminals with the voltage at the output of the regulator circuit and ahead of the series-connected impedance. This second regulator circuit controls a circuit that, in turn, controls the value of the reference voltage. When the output terminals of the power supply are connected incorrectly to the input circuit of the monitor, the second comparison circuit controls the additional circuit to keep the reference voltage low, so that the output voltage of the power supply will be at a safe low level and will not injure the input circuit of the monitor. If the output terminals of the power supply are connected correctly to the television camera, the voltage measured by the second comparison circuit will have a value such that the additional circuit means will be controlled to cause the reference voltage to change to a high value, thus allowing the power supply to produce its normal, relatively high direct voltage. If the output terminals of the power supply are not connected to any load, the second comparison circuit will keep the additional circuit means in a condition such that the reference voltage will be held at a low value and the output direct voltage of the power supply will also be held at a low value. Thus, the only condition in which the power supply will be permitted to produce an output direct voltage to the relatively high value required to operate a television camera is when the power supply is properly connected to a camera.

DESCRIPTION OF THE PREFERRED EMBODIMENTS

Figure 1:
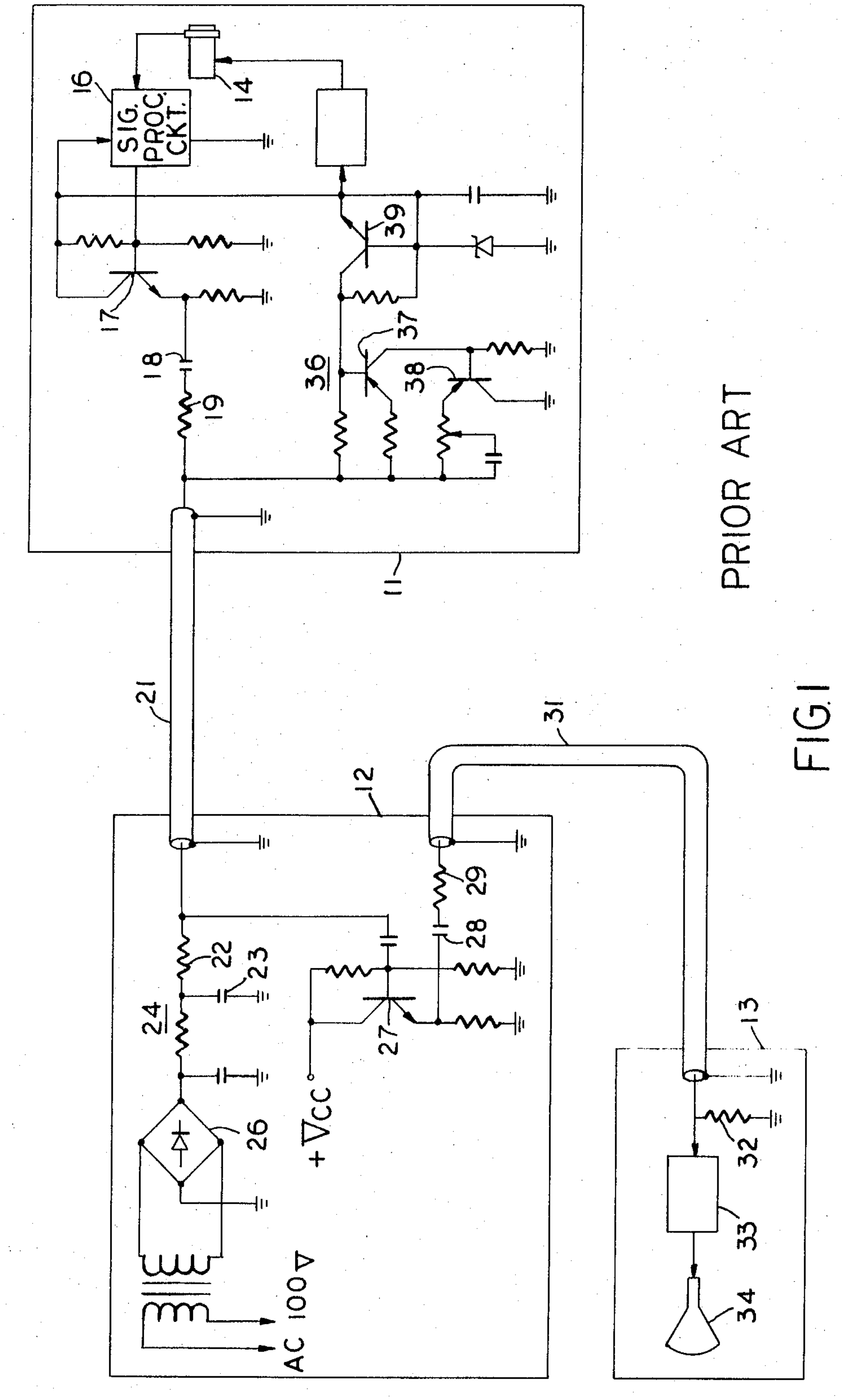
PRIOR ART FIG. 1
FIG. 1 is a simplified schematic circuit diagram showing a power supply, a television camera, and a television monitor as used in an industrial television circuit according to the prior art.

The television shown in FIG. 1 includes a television camera 11, a power supply 12 and a television monitor 13. In the television camera 11 a video signal derived from an image pickup tube 14 is supplied to a signal processing circuit 16, and the processed signal at the output of the circuit 16 is applied to the base of a transistor 17. The transistor 17 is connected as an emitter follower, the emitter of which is connected by way of a capacitor 18 and an impedance matching resistor 19 to a coaxial cable 21. A typical resistance value of the resistor 19 is 75 ohms.

The coaxial cable 21 is connected to the power supply 12 and is terminated in a matching resistor 22. The other end of the matching resistor 22 is, in effect, connected to ground by a capacitor 23 that forms a low impedance path for video signals. This capacitor is a smoothing capacitor or a power source 24 that is connected to the AC supply line and includes a bridge rectifier 26. The video signal from the coaxial cable 21 is supplied through a transistor 27 connected as an emitter follower, a capacitor 28, and an impedance matching resistor 29 to another coaxial cable 31. The other end of this cable is connected to the television monitor 13. Included in the monitor 13 is a resistor 32 that matches the impedance of the coaxial cable 31. This impedance-matching resistor 32 also has a resistance of 75 ohms. The voltage across the matching resistor 32 is applied to television circuits collectively identified by reference character 33 and is finally applied to a cathode ray picture tube 34.

The direct voltage from the power supply 20 is fed through the resistor 22 and the coaxial cable 21 to the television camera 11. In the camera 11, the direct voltage from the power supply is applied to a constant current circuit 36. This circuit removes any video signal ripple on the direct voltage supply through the coaxial cable 21. Any such ripple voltage is detected by a transistor 37, and the output signal from this transistor is applied to a transistor 38 to control the impedance thereof so as to cancel out the ripple voltage. Thus, the direct voltage derived from the constant current circuit 36 is supplied through a constant voltage transistor 39 to serve as the operating voltage for the signal processing circuit 16 and as the collector voltage for the transistor 17. The operating voltage for the television monitor 13 is not supplied over the cable 31 but is generated by a power source located within the monitor itself.

The connectors for the cables 21 and 31 are not illustrated but are conventional connectors for industrial television systems and are easy to maintain in repair. With the arrangement shown in FIG. 1, however, it is possible that the cables 21 and 31 may be interchanged so that the direct voltage from the rectifying circuit 24 is applied to the resistor 32 in the television monitor 30. This voltage could burn out the resistor 32 as well as the resistor 22 of the power supply 12. Another possible result of interchanging the coaxial cables 21 and 31 is that the rectifying circuit 24 might, itself, be damaged. The possibility of interchanging the cables 21 and 31 could be avoided by using different connectors for the two cables but this would make it necessary to keep two types of connectors on hand for spares in case one or the other of the of the connectors needed to be replaced.

In view of these difficulties in the prior art system, the present invention is directed to the provision of a power supply device in which the interchange of cables would make the difference. The load impedance into which the rectifying circuit 24 works is different when the camera 11 is connected to the power supply 12 than when the television monitor 13 is connected as the power supply load. When the connection is correct, the appropriate impedance will be detected and the predetermined power supply voltage can be delivered to it.

As a specific example, if the power supply voltage applied to the cable 21 is assumed to be 17 volts and the power consumption of the camera 11 is 17V × 190 mA, or 2.23 watts, the equivalent resistance for direct current is 90 ohms. This value is close to the resistance value of 75 ohms for the resistor 32, and it would be difficult to detect the difference between an operating load of 90 ohms and the 75 ohm resistance of the resistor 32 in the monitor 13, when the power supply voltage is 17 volts.

In general, in electronic apparatus, the relationship between the power supply voltage, or operating voltage, and the current consumption is not linear. When the power supply voltage is reduced, the current consumption is also reduced but to a greater degree. This is equivalent to saying that, when the power supply voltage is decreased, the equivalent resistance of the circuit to direct current is increased. This effect is true in the camera 11. Thus, even though the equivalent resistance to direct current is 90 ohms in the example mentioned when the power supply voltage is 17 volts, the equivalent resistance increases to about 140 ohms if the power supply voltage is reduced to 3 volts. If the equivalent direct current resistance of the camera 11 is 140 ohms, it is relatively easy to discriminate between that value and the value of 75 ohms of the resistor 32.

In accordance with the present invention, the power supply voltage is first reduced below the normal value, so that a circuit in the power supply can detect the difference between the possible load impedance connected to it. If the output of the power supply is properly connected by the coaxial cable 21 to the camera 11, the detected impedance will be relatively high. On the other hand, if the cable 21 is interchanged with the cable 31 and is connected to the monitor 13 instead of to the camera 11, the detecting circuit will detect the impedance of the resistor 32. Not only is there a substantial difference between the 75 ohm impedance of the resistor 32 and the effective impedance of about 140 ohms of the camera 11 when the power supply voltage is at a low value of about 3 volts, but this low value of voltage can be safely impressed across the resistor 32 without burning it out and without drawing enough current through the resistor 22 to burn that out.

Figure 2:
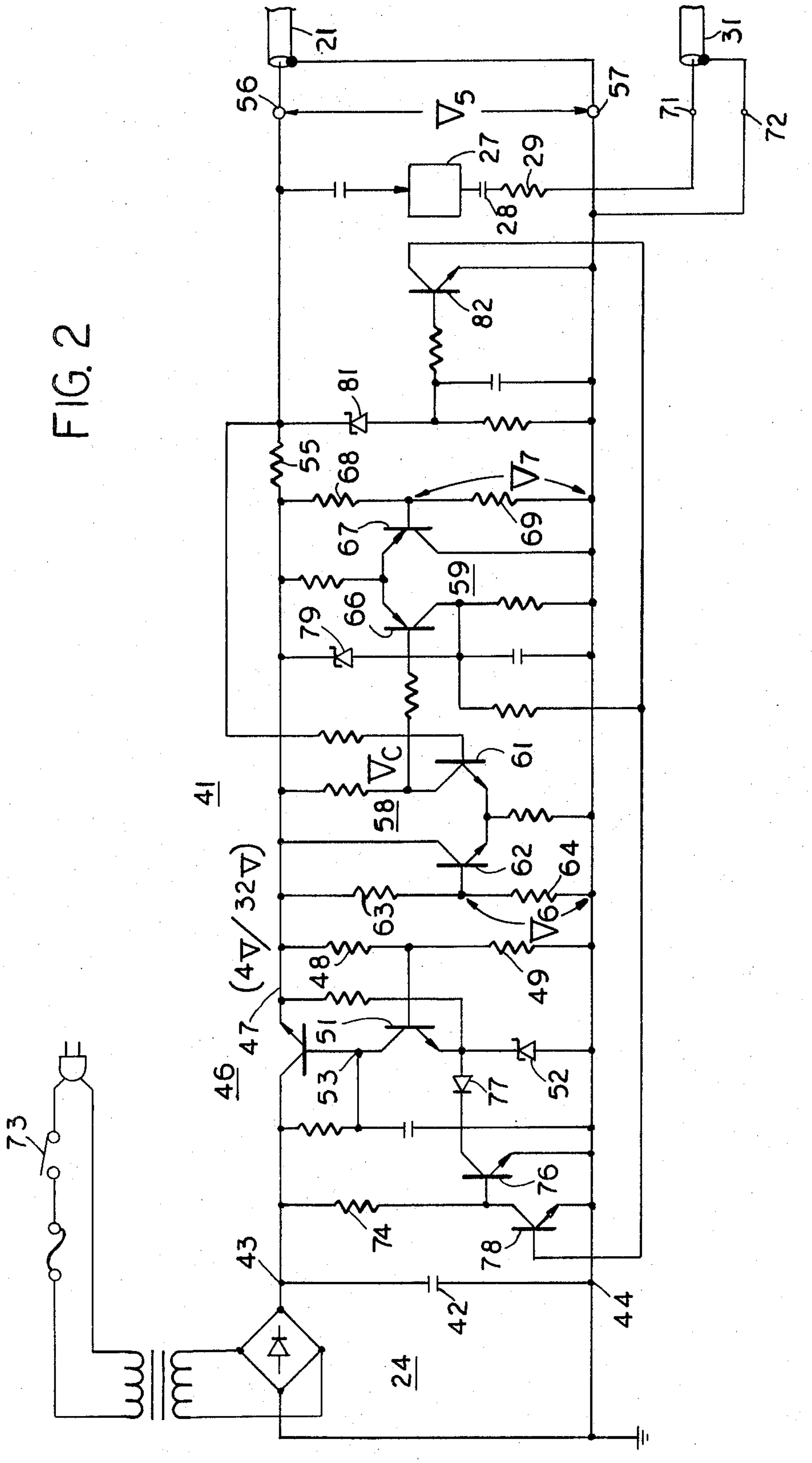
FIG. 2 is a schematic diagram of a modified power supply circuit according to the present invention and capable of being used in the system shown in FIg. 1.

FIG. 2 shows a modified power supply 41 that includes a circuit for detecting the impedance to which the power supply is connected. The supply 41 includes a power source 24 similar to that in FIG. 1. The output voltage of the power source 24 is impressed across a filter capacitor 42 between terminals 43 and 44 that also form input terminals for a voltage regulator 46. The output voltage of the voltage regulator 46 is available between the common terminal 44 and a so-called hot terminal 47. This voltage is impressed across a voltage divider comprising a pair of resistor 48 and 49, and the intermediate point of this voltage divider is connected to the base of a transistor 51. A zener diode 52 is connected between the emitter of the transistor 51 and the common ground terminal 44. This zener diode furnishes a reference voltage that is compared by the transistor 51 with the voltage at the tap between the resistors 48 and 49. The collector of the transistor 51 is connected to the base of a series-regulator transistor 53 to control the impedance of the latter and thereby the voltage between the terminals 47 and 44 to have a constant value which is a function of the reference voltage across the zener diode 52.

A resistor 55 is connected in series between the output terminal 47 of the voltage regulator 46 and a so-called hot output terminal 56 of the power supply. This output terminal is connected to the center conductor of the coaxial cable 21. The outer conductor of the coaxial cable is connected to a grounded terminal 57 that is directly connected to the terminal 44. The resistor 55 serves as a matching resistor to match the impedance of the coaxial cable 21 and therefore typically has a value of 75 ohms. Two differential amplifiers 58 and 59 are connected between the terminals 47 and 44 to be operated by the output voltage of the voltage regulator 46. The differential amplifier 58 consists of two transistors 61 and 62. The base of the transistor 61 is connected to the power supply output terminal 56 so that the transistor 61 is controlled by the output voltage across the terminals 56 and 57. The base of the transistors 62 is connected to the junction between two resistors 63 and 64 that form another voltage divider between the terminals 47 and 44. Thus the differential amplifier 58 operates by comparison of the output voltage of the voltage regulator 46 with the output voltage of the power supply, itself.

The differential amplifier 59 comprises two transistors 66 and 67 which are of the opposite conductivity type from the transistors 61 and 62. The base of the transistor 66 is connected to the collector of the transistor 61 and the base of the transistor 67 is connected to the common junction between two resistors 68 and 69 that form yet another voltage divider across the terminals 47 and 44. The differential amplifier 59 operates by comparing the output voltage at the collector of the transistor 61 with the voltage at the common junction between the resistors 68 and 69.

The amplifier 27 in FIg. 1 is also shown in FIG. 2 connected to the center conductor of the coaxial cable 21. The output of the amplifier 27 is connected by way of a capacitor 28 and an impedance matching resistor 29 to a terminal 71. This terminal is connected to the center conductor of the coaxial cable 31 and the outer conductor of the coaxial cable is connected to a grounded terminal 72. The power supply 41 has a power switch 73 to turn it on and off. A resistor 74 is connected between the terminal 43 and the base of a transistor 76, and the emitter-collector circuit of this transistor is connected between the common terminal 44 and a diide 77, which is connected to the emitter of the transistor 51. The transistor 76 and the diode 77 thus form a series circuit in parallel with the zener diode 52.

When the power supply 41 in FIG. 2 is placed in operation by closing the switch 73, the transistor 76 is biased to a state of conductivity by way of the resistor 74. In this condition, the transistor 76 and the diode 77 form a source of a relatively low reference voltage that prevents the zener diode 52 from operating in its usual manner. The low reference voltage across the diode 77 and the transistor 76 is compared by the transistor 51 with the voltage at the common junction between the resistors 48 and 49 and causes the transistor 53 to assume a relatively large impedance so that the voltage between the terminals 47 and 44 is at a low level of about 4 volts. If the coaxial cable 21 is properly connected to the camera 11 shown in FIG. 1, the 4 volts across the terminals 47 and 48 is applied across a series circuit comprising the resistor 55 and the direct current circuits in the camera 11. Since these direct current circuits have an equivalent DC resistance of about 140 ohms under this condition, the voltage $V_5$ between the terminals 56 and 57 is about 2.6 volts.

On the other hand, if the coaxial cables 21 and 31 are misconnected so that the cable 21 is connected to the monitor 13, the impedance presented across the terminals 56 and 57 will be 75 ohms, the impedance of the resistor 32. Since the resistor 55 is also 75 oms, the 4 volts between the terminals 47 and 44 will be divided so that the voltage $V_5$ is about 2 volts. This is substantially less than the voltage of 2.6 volts when the coaxial cable 21 is properly connected to the camera 11.

If the switch 73 is closed when the cable 21 is not connected to anything, there will be no current through the resistor 55 and so the voltage $V_5$ across the terminals 56 and 57 will be the full 4 volts, the same as the voltage between the terminals 47 and 44 and substantially more than the correct voltage of 2.6 volts.

The ratio of the resistors 63 and 64 is such that, when the coaxial cable 21 is properly connected to the camera 11, the voltage $V_5$ of approximately 2.6 volts is larger than the voltage $V_6$ across the resistor 64. As a result, the transistor 61 becomes conductive and the transistor 62 non-conductive. The ratio of the resistors 68 and 69 is such that, when the transistor 61 becomes conductive, the voltage $V_c$ at its collector is lower than the voltage $V_7$ across the resistor 69. This causes the transistor 66 to become conductive and the transistor 67 non-conductive.

The base of a transistor 78 is connected to the collector of the transistor 66, and the emitter-collector circuit of the transistor 78 is connected across the baseemitter circuit of the transistor 76. When the voltage at the collector of the transistor 66 is raised, the transistor 78 becomes conductive and reduces the voltage at the base of the transistor 76 to the point that the latter no longer conducts. The formerly conductive circuit comprising the emitter-collector circuit of the transistor 76 and the diode 77 ceases to be conductive and the voltage across the zener diode 52 is free to rise to the conductive level at which it is stabilized. The comparison transistor 51 is thus caused to reduce the impedance of the transistor 53 so that the voltage between the terminals 47 and 44 increases substantially and to the normal level. Due to the voltage drop across the transistor 55 in normal operation, the voltage at the terminal 47 is approximately 32 volts, which results in a voltage at the terminal 56 of approximately 17 volts positive with respect to the ground terminal 57.

A zener diode 79 is connected from the terminal 47 to the collector of the transistor 66, and when the voltage at the terminal 47 rises to a level of 32 volts, this zener diode becomes conductive and keeps the voltage at the base of the transistor 78 and its conductive level.

Video signals coming back along the cable 21 from the camera 11 are applied across the impedance matching resistor 55. The output impedance of the voltage regulator circuit 46 is quite low, as measured at the terminal 47, and thus the end of the resistor 55 connected to the terminal 47 is at AC ground potential. These video signals are then coupled to the amplifier 27 and, by way of the capacitor 28 and the resistor 29, to the cable 31, which goes to the monitor 13.

On the other hand, if the cable 21 is connected to the monitor 13 when the power supply 41 is put into operation, the resistor 32 is effectively connected directly across the output terminals 56 and 57 of the power supply. As previously stated, under such circumstances the voltage $V_5$ is approximately only 2 volts, which is less than the voltage $V_6$ at the base of the transistor 62. As a result, the transistor 61 is nonconductive and the transistor 62 is conductive. This causes the conductor voltage $V_c$ at the collector of the transistor 61 to be approximately equal to the voltage at the terminal 47 with the result that the transistor 66 becomes nonconductive and the voltage at its collector decreases, making the voltage at the base of the transistor 78 too low to allow that transistor to conduct. This allows the transistor 76 to remain conductive so that the circuit comprising the emitter-collector circuit of the transistor 76 and the diode 77 maintains the reference voltage at the emitter of the transistor 51 at a low level and thus keeps the output voltage of the voltage regulator 46, as measured at the terminal 47, at the low level of approximately 4 volts. This is not sufficient to make the zener diode 79 conductive, and the voltage $V_5$ at the output terminal 56 remains at the level of 2 volts. As a result, a small current of approximately 27 mA flows through the resistor 32. The power dissipated in the resistor 32 under such circumstances is only approximately 52mW. Even a physically small resistor can handle this power. Furthermore, the power dissipated by the resistor 55 will also be small so that it will not be injured nor will the voltage regulator 46 be injured.

As previously stated, if the power supply output terminals 56 and 57 are not connected to any coaxial cable, the voltage $V_5$ will be approximately 4 volts, which is higher than the voltage $V_6$ across the resistor 64. However, this voltage $V_5$ is so high that a large base current will be forced to flow through the transistor 61 and through the emitter thereof. This base current increases the voltage at the emitter due to an increased voltage drop across the emitter resistor. The voltage drop between the emitter and the collector of the transistor 61 under such circumstances is quite low so that the collector voltage $V_c$ will also be increased to the point where it is higher than the voltage $V_7$ across the resistor 69. This is the same condition that exists when the coaxial cable 21 is connected incorrectly to the television monitor 13. In that case the voltage $V_5$ was approximately 2 volts, which was below the proper voltage of approximately 2.6 volts. Under the present conditions the voltage $V_5$ is approximately 4 volts, which is higher than the proper voltage. Thus, the differential amplifiers 58 and 59 achieve the same result when the voltage $V_5$ departs from the proper level in either the positive or nagative direction.

If the terminals 56 and 57 are now connected by way of the coaxial cable 27 to the camera 11, the load presented by the camera causes the voltage at the terminals 56 and 57 to drop to the correct level of 2.6 volts which, by way of the comparison circuits represented by the differential amplifiers 58 and 59, causes the transistor 76 to become non-conductive and allows the output voltage of the voltage regulator 46 as measured between the terminals 47 and 44 to rise to approximately 32 volts. As stated previously, this causes a voltage of approximately 17 volts to exist across the power supply output terminals 56 and 57.

If the coaxial cable 21 is suddenly disconnected from the terminals 56 and 57 when the voltage $V_5$ is at the proper level of 17 volts, this voltage will rise to approximately 32 volts since there will be no voltage drop across the resistor 55. A zener diode 81 becomes conductive when the voltage $V_5$ rises substantially above the level of 17 volts. When the zener diode 81 becomes conductive, it biases another transistor 82 so that it also becomes conductive. The emitter-collector circuit of the transistor 82 is connected across the base-emitter circuit of the transistor 78, and when the transistor 82 becomes conductive, the transistor 78 becomes nonconductive. This allows the transistor 76 to become conductive, thereby reducing the reference voltage at the emitter of the transistor 51 and causing the voltage between the two terminals 47 and 44 to drop to the level of approximately 4 volts.

Thus, the power supply circuit of the present invention allows the voltage $V_5$ between the terminals 56 and 57 to reach the level of approximately 17 volts only when those terminals are properly connected to a circuit that effectively loads down the power supply by the correct amount. If the load on the power supply terminals 56 and 57 is too great, which would be true if the coaxial cable 21 were connected to the television monitor 13, or if there were no load at all across the terminals 56 and 57, the circuit of the present invention would automatically drop the voltage across the terminals 56 and 57 to a safe, low level.

It is to be understood that the exact voltages referred to are only for purposes of illustration. Furthermore, the power supply of the present invention can be used with other circuits in addition to television cameras. Power supplies are made and sold by themselves for general use with many different circuits, and it is convenient to have the safety features of the present invention to prevent the output terminals of the power supply from being connected to an unsuitable load.

What is claimed is:

1. A power supplying device comprising:

A. power supply output terminals;

B. a voltage source;

C. a voltage regulator connected to said source to be energized thereby and comprising voltage regulator output circuit;

D. an impedance connecting said output circuit to said output terminals; and

E. a comparison circuit to compare the voltage across said output terminals with a voltage in said output circuit to obtain a voltage ratio in said comparison circuit, said comparison circuit being connected to said regulator to control the operation thereof to keep the voltage across said output terminals low when the voltage ratio in said comparison circuit differs from a predetermined value.

2. The power supplying device of claim 1 in which said voltage regulator comprises:

A. means to produce a reference voltage; and

B. a second comparison circuit connected to the output of said voltage regulator to compare the output voltage of said voltage regulator with said reference voltage, said first-named comparison circuit being connected to said means to produce a reference voltage to cause said reference voltage to have a certain value when the voltage ratio in said first-named comparison sircuit differs from the predetermined value and a different value when said voltage ratio has the predetermined value.

3. The power supplying device of claim 2 in which said means to produce a reference voltage comprises:

A. diode means to produce a reference voltage of relatively high value; and

B. semiconductor means connected in parallel with said diode means and connected to said first-named comparison circuit to be conrolled thereby, said semiconductor means being made conductive by said first-named comparison circuit to reduce the voltage across said diode means when the voltage ratio in said first-named comparison circuit differs from said predetermined value.

4. The power supplying device of claim 3 in which said first-named comparison circuit comprises:

A. a first differential amplifier comprising input circuits connected differentially to said impedance to measure the voltage thereacross to produce said voltage ratio;

B. a second differential amplifier comprising one input circuit connected to said output circuit of said voltage regulator and a second input circuit connected to said first differential amplifier to respond, differentially, to the output voltage of said voltage regulator, said second differential amplifier comprising an output circuit connected to said semiconductor means to control the same; and C. separate means connected between said output circuit of said voltage regulator and said semiconductor means to maintain said semiconductor means conductive when said second differential amplifier causes said semiconductor means to become conductive.

5. The power supplying device of claim 4 comprising, in addition:

A. second semiconductor means connected to the input of said first-named semiconductor means; and B. circuit means connecting said output terminals to said second semiconductor means to cause said second semiconductor means to become conductive when the voltage between said output terminals exceeds an acceptable value, whereby said first-named semiconductor means connected in parallel to said diode means becomes conductive when the voltage between said output terminals exceeds the acceptable value.

* * * * *